US006959291B1

(12) United States Patent
Armstrong et al.

(10) Patent No.: US 6,959,291 B1
(45) Date of Patent: *Oct. 25, 2005

(54) MANAGEMENT OF A CONCURRENT USE LICENSE IN A LOGICALLY-PARTITIONED COMPUTER

(75) Inventors: William Joseph Armstrong, Kasson, MN (US); Naresh Nayar, Rochester, MN (US); Kevin Patrick Stamschror, Wabasha, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/314,324

(22) Filed: May 19, 1999

(51) Int. Cl.[7] .............................................. G06F 17/00
(52) U.S. Cl. ...................................... 705/59; 718/100
(58) Field of Search ............................ 705/51, 53, 59, 705/34, 52, 57; 345/734; 713/200; 717/11; 709/219; 710/5, 20, 19; 718/100, 104

(56) References Cited

U.S. PATENT DOCUMENTS

| 3,641,505 | A | | 2/1972 | Artz et al. .................... 710/100 |
| 4,511,964 | A | | 4/1985 | Georg et al. ................. 711/202 |
| 4,601,008 | A | | 7/1986 | Kato ............................ 710/260 |
| 4,843,541 | A | | 6/1989 | Bean et al. ..................... 710/36 |
| 4,924,378 | A | * | 5/1990 | Hershey et al. ............. 713/201 |
| 5,129,088 | A | | 7/1992 | Auslander et al. ............. 711/1 |
| 5,204,897 | A | * | 4/1993 | Wyman ....................... 710/200 |
| 5,253,344 | A | | 10/1993 | Bostick et al. .................. 710/8 |
| 5,263,158 | A | | 11/1993 | Janis ............................. 707/1 |
| 5,297,287 | A | | 3/1994 | Miyayama et al. ............. 713/1 |
| 5,345,590 | A | | 9/1994 | Ault et al. ...................... 709/1 |
| 5,365,514 | A | | 11/1994 | Hershey et al. ............. 370/241 |
| 5,375,206 | A | * | 12/1994 | Hunter et al. ................ 717/111 |

(Continued)

FOREIGN PATENT DOCUMENTS

| JP | 07-200492 | 8/1995 |
| JP | 10-111797 | 4/1998 |
| JP | 10-301795 | 11/1998 |
| WO | WO 95/18998 | 7/1995 |

OTHER PUBLICATIONS

Hauser, Ralf; Does licensing require new access control techniques?; Nov. 1994; Communications of the ACM, v37n11 pp: 48–55; dialog copy pp. 1–10.*
McGilton et al; Introducing the UNIX system; 1983, R.R. Donnelley & Sons Company; pp. 515–521.*
Microsoft Computer Dictionary, copyright 1993, second Edition; Microsoft Press; pp. 146, 243, 292.*
VMWare Virtual Platform—Technology White Paper, http:vmware.com/products/virtualplatform.html (1999).
IBM Technical Disclosure Bulletin, Kreulen, "OS/2 Raw FileSystem," vol. 40, No. 05, pp. 177–190, May 1997.
IBM Technical Disclosure Bulletin, Baskey et al., "Highly Parallel Coupling Facility Emulator/Router with Shadowed Link Buffers," vol. 39, No. 12, pp. 123–124, Dec. 1996.
Abstract for JAPIO Application No. 94–103092, T. Imada et al., Apr. 15, 1994, "Virtual Computer System."

(Continued)

*Primary Examiner*—Thomas A. Dixon
(74) *Attorney, Agent, or Firm*—Wood, Herron & Evans

(57) ABSTRACT

An apparatus, program product and method track concurrent uses of a computer program across a plurality of logical partitions in a logically partitioned computer, such that a decision as to whether to grant or deny a request to use the computer program in a particular logical partition may be made based upon whether the requested use, coupled with other uses in other logical partitions in the computer, would violate a concurrent use software license associated with the computer program. As such, the license restrictions of a concurrent use software license can be enforced on a logically partitioned computer regardless of the particular logical partitions within which a computer program executes.

18 Claims, 5 Drawing Sheets

U.S. PATENT DOCUMENTS

| | | | |
|---|---|---|---|
| 5,446,902 A | 8/1995 | Islam | 717/3 |
| 5,465,360 A | 11/1995 | Miller et al. | 713/1 |
| 5,526,488 A | 6/1996 | Hershey et al. | 709/242 |
| 5,550,970 A | 8/1996 | Cline et al. | 345/772 |
| 5,566,337 A | 10/1996 | Szymanski et al. | 710/260 |
| 5,574,914 A | 11/1996 | Hancock et al. | 712/220 |
| 5,600,805 A | 2/1997 | Fredericks et al. | 710/5 |
| 5,659,756 A | 8/1997 | Hefferon et al. | 710/200 |
| 5,659,786 A | 8/1997 | George et al. | 713/100 |
| 5,671,405 A | 9/1997 | Wu et al. | 707/7 |
| 5,675,791 A | 10/1997 | Bhide et al. | 707/205 |
| 5,684,974 A | 11/1997 | Onodera | 711/202 |
| 5,687,363 A | 11/1997 | Oulid-Aissa et al. | 707/4 |
| 5,692,174 A | 11/1997 | Birely et al. | 707/3 |
| 5,692,182 A | 11/1997 | Desai et al. | 707/10 |
| 5,742,757 A * | 4/1998 | Hamadani et al. | 713/200 |
| 5,784,625 A | 7/1998 | Walker | 710/260 |
| 5,819,061 A | 10/1998 | Glassen et al. | 709/1 |
| 5,828,882 A | 10/1998 | Hinckley | 709/318 |
| 5,845,146 A | 12/1998 | Onodera | 710/2 |
| 5,923,890 A | 7/1999 | Kubala et al. | 712/1 |
| 5,948,065 A | 9/1999 | Eilert et al. | 709/1 |
| 5,978,857 A | 11/1999 | Graham | 709/312 |
| 5,996,026 A | 11/1999 | Onodera et al. | 710/3 |
| 6,021,438 A * | 2/2000 | Duvvoori et al. | 709/224 |
| 6,061,695 A | 5/2000 | Slivka et al. | 707/513 |
| 6,075,938 A | 6/2000 | Bugnion et al. | 703/27 |
| 6,148,323 A | 11/2000 | Whitner et al. | 709/105 |
| 6,173,337 B1 | 1/2001 | Akhond et al. | 709/318 |
| 6,199,179 B1 | 3/2001 | Kauffman et al. | 704/26 |
| 6,247,109 B1 | 6/2001 | Kleinsorge et al. | 712/13 |
| 6,263,359 B1 | 7/2001 | Fong et al. | 709/103 |
| 6,269,391 B1 | 7/2001 | Gillespie | 709/100 |
| 6,269,409 B1 | 7/2001 | Solomon | 709/329 |
| 6,282,560 B1 | 8/2001 | Eilert et al. | 709/100 |
| 6,496,847 B1 | 12/2002 | Bugnion et al. | |
| 6,704,766 B1 * | 3/2004 | Goss et al. | 718/104 |

OTHER PUBLICATIONS

Abstract for JAPIO Application No. 92–348434, T. Imada et al., Dec. 3, 1992, "Virtual Computer System."

Inspec Abstract No. C9408–6110P–022, A. B. Gargaro et al., Mar. 1994, "Supporting Distribution and Dynamic Reconfiguration in AdaPT."

Gomes, Lee, "Desktops to get OS freedom of choice," Wall Street Journal Online, Mar. 26, 1999.

VMWare 1.0.x for Linux Changelog Archive (1999).

"Microsoft Computer Dictionary," Microsoft Press, 4th Edition, 1999.

"S/390 Parallel Enterprise Server—Generation 3, S/390 Coupling Facility Model C04, System Overview," Publication GA22–7150–00, IBM Japan, 1997.

* cited by examiner

MANAGEMENT OF A CONCURRENT USE LICENSE IN A LOGICALLY-PARTITIONED COMPUTER

RELATED APPLICATIONS

This patent application is related to the following patent applications: U.S. Patent Application, entitled "Apparatus and Method for Specifying Maximum Interactive Performance in a Logical Partition of a Computer System Independently from the Maximum Interactive Performance in Other Partitions," Ser. No. 09/314,541, filed May 19, 1999 by Armstrong et al.; U.S. Patent Application, entitled "Processor Reset Generated via Memory Access Interupt," Ser. No. 09/314,769 filed May 19, 1999 by Armstrong et al.; U.S. Patent Application, entitled "Event-Driven Communications Interface for Logically-Partitioned Computer," Ser. No. 09/314,187 filed May 19, 1999 by Armstrong et al.; (now issued as U.S. Pat. No. 6,279,046); and U.S. Patent Application, entitled "Logical Partition Manager and Method," Ser. No. 09/314,214 filed May 19, 1999.

FIELD OF THE INVENTION

The invention is generally related to computers and computer software. In particular, the invention is generally related to managing concurrent use licenses to selectively grant or deny requests to use computer programs on a computer.

BACKGROUND OF THE INVENTION

Concurrent use licenses are routinely used in the software industry as a convenient and often cost-effective manner of providing computer software to customers. Unlike other types of licenses that typically limit the number of copies of a computer program that can be installed on a customer's computers, a concurrent use license typically limits how many users can access or use a computer program at one time. While other applications of concurrent use licenses exist, one particularly beneficial application is in networked computer systems where multiple copies of a computer program are executed on a server or other multi-user computer accessible by multiple users. In such a system, a customer can often license a computer program for a fee that is based upon the number of users that the customer expects will need access to the computer program at one time, which is often significantly lower than the total number of users having access to the system.

Software-based license managers are conventionally used on multi-user computers and the like to restrict the use of computer programs based upon the terms of concurrent use licenses associated with those computer programs. With a software-based license manager, uses of a computer program are tracked for a given computer, and requests to use the computer program are automatically granted or denied based upon the number of other uses being tracked by the license manager.

A number of conventional license managers rely on the use of software "keys" to handle requests to use computer programs. Specifically, when a customer licenses a computer program, the customer is provided with a software code that includes a product identifier (which identifies the licensed computer program), a machine identifier (which identifies the particular computer upon which the computer program will execute), and a license identifier (which identifies the license terms, e.g., the allowed maximum number of concurrent users for the computer program). The key is also typically encrypted so that the information contained therein cannot be modified by the customer or others to defeat the license restrictions.

When the computer program is installed on the customer's computer, the software key is provided to the license manager on the computer, and the license manager verifies that the product is indeed licensed for the computer by comparing the machine identifier in the key with that maintained in the computer. Subsequent requests by users to use the computer program are then handled by the license manager to limit the number of concurrent uses to that specified in the key.

With many licence management schemes, the machine identifier is tied to a unique and non-modifiable identifier associated with the underlying computer hardware (e.g., the computer's serial number) to prevent an unauthorized party from changing the machine identifier for a computer to match that of an authorized computer and illegally installing a computer program, originally licensed for the authorized computer, on the unauthorized computer. However, tying the machine identifier to a serial number or other unique identifier for the underlying computer hardware can introduce a significant management problem when the computer utilizes logical partitioning.

Specifically, with logical partitioning, a single physical computer is permitted to operate essentially like multiple and independent "virtual" computers (referred to as logical partitions), with the various resources in the physical computer (e.g., processors, memory, input/output devices, etc.) allocated among the various logical partitions by a shared partition manager, often also referred to as a "hypervisor". Each logical partition executes a separate operating system, and from the perspective of users and of the software executing on the logical partition, operates as a fully independent computer.

Given the independence of logical partitions, conventional approaches to license management utilize a separate license manager in each logical partition to handle the license management operations for the applications residing within the logical partition. Despite the logical independence of the logical partitions, however, the logical partitions still share the same machine identifier given that they reside on the same underlying computer hardware.

As a result, with conventional approaches a customer may be able to use the same software key to install a licensed computer program on multiple logical partitions on the same physical computer. Furthermore, such license managers, which are typically the same programs used on non-partitioned computers, have no capability to determine whether a particular program is currently in use in other partitions. Consequently, while the license manager in each logical partition may limit the number of concurrent uses within that logical partition to match the license restrictions set forth in the software key, the aggregate number of concurrent uses across all of the logical partitions may exceed the license restrictions. In essence, the license restrictions are defeated simply by installing a program on multiple logical partitions.

Therefore, a significant need exists for an improved manner of managing concurrent use licenses in a logically partitioned computer, and specifically to manage the number of concurrent uses of a computer program across multiple logical partitions.

SUMMARY OF THE INVENTION

The invention addresses these and other problems associated with the prior art by providing an apparatus, program product, and method that track concurrent uses of a computer program across a plurality of logical partitions in a logically partitioned computer, such that a decision as to whether to grant or deny a request to use the computer program in a particular logical partition may be made based upon whether the requested use, coupled with other uses in other logical partitions in the computer, would violate a concurrent use software license associated with the computer program. As such, the license restrictions of a concurrent use software license can be enforced on a logically partitioned computer regardless of the particular logical partitions within which a computer program executes.

In one illustrative, but not exclusive, embodiment of the invention, concurrent use tracking is implemented in a partition manager or other shared resource accessible by each logical partition in a logically partitioned computer. License management is then handled within each logical partition by a license manager that accesses the partition manager as needed to limit the total number of concurrent uses for a particular computer program across all logical partitions. As such, the logical independence of each logical partition is maintained, without the need for license managers in different logical partitions to interact with one another.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Hardware and Software Environment

Figure 1:
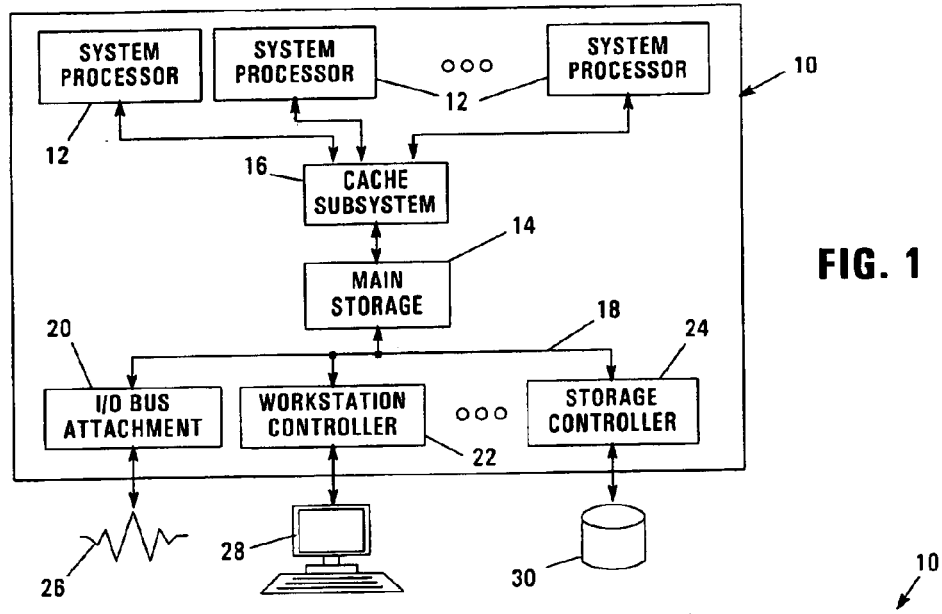
FIG. 1 is a block diagram of a computer consistent with the invention.

Turning to the Drawings, wherein like numbers denote like parts throughout the several views, FIG. 1 illustrates a data processing apparatus or computer 10 consistent with the invention. Apparatus 10 generically represents, for example, any of a number of multi-user computer systems such as a network server, a midrange computer, a mainframe computer, etc. However, it should be appreciated that the invention may be implemented in other data processing apparatus, e.g., in stand-alone or single-user computer systems such as workstations, desktop computers, portable computers, and the like, or in other computing devices such as embedded controllers and the like. One suitable implementation of apparatus 10 is in a midrange computer such as the AS/400 series computer available from International Business Machines Corporation.

Apparatus 10 generally includes one or more system processors 12 coupled to a memory subsystem including main storage 14, e.g., an array of dynamic random access memory (DRAM). Also illustrated as interposed between processors 12 and main storage 14 is a cache subsystem 16, typically including one or more levels of data, instruction and/or combination caches, with certain caches either serving individual processors or multiple processors as is well known in the art. Furthermore, main storage 14 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

Figure 2:
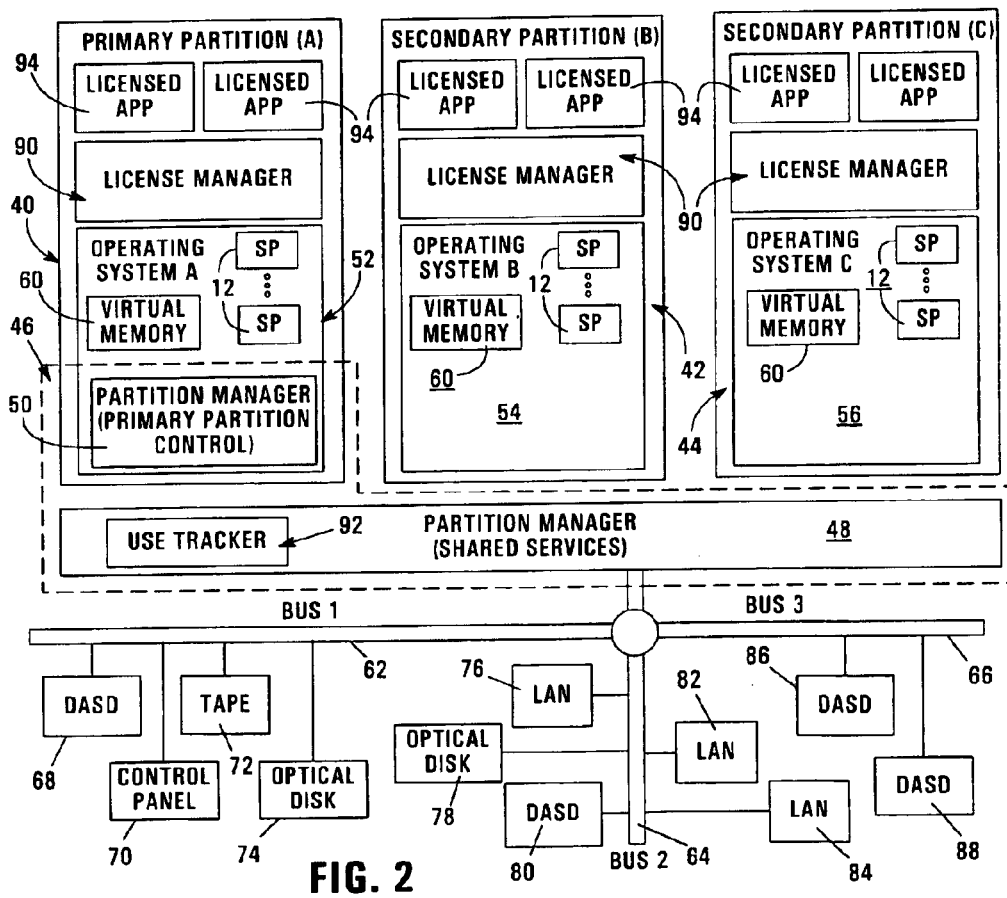
FIG. 2 is a block diagram of the primary software components and resources in the computer of FIG. 1.

FIG. 2 illustrates in greater detail the primary software components and resources utilized in implementing a logically partitioned computing environment on computer 10, including a plurality of logical partitions 40, 42, 44 managed by a partition manager 46. Any number of logical partitions may be supported as is well known in the art.

In the illustrated implementation, logical partition 40 operates as a primary partition, while logical partitions 42 and 44 operate as secondary partitions. A primary partition in this context shares some of the partition management functions for the computer, such as handling the powering on or powering off of the secondary logical partitions on computer 10, or initiating a memory dump of the secondary logical partitions. As such, a portion of partition manager 46 is illustrated by primary partition control block 50, disposed in the operating system 52 resident in primary partition 40. Other partition management services, which are accessible by all logical partitions, are represented by shared services block 48. Implementation of partition management functionality within a primary logical partition is described, for example, in U.S. Patent Application, entitled "Logical Partition Manager and Method," Ser. No. 09/314,214 filed May 19, 1999, which is incorporated by reference herein. However, partition management functionality need not be implemented within any particular logical partition in other implementations consistent with the invention.

Each logical partition utilizes an operating system, e.g., operating systems 52, 54 and 56 for logical partitions 40, 42 and 44, respectively), that controls the primary operations of the logical partition in the same manner as the operating system of a non-partitioned computer. For example, each operating system 52–56 may be implemented using the OS/400 operating system available from International Business Machines Corporation, residing on top of a kernel, e.g., AS/400 system licensed internal code (SLIC). The shared services in block 48 are alternatively referred to herein as partition licensed internal code (PLIC).

Each logical partition 40–44 executes in a separate memory space, represented by virtual memory 60.

Moreover, each logical partition 40-44 is statically and/or dynamically allocated a portion of the available resources in computer 10. For example, each logical partition is allocated one or more processors 12, as well as a portion of the available memory space for use in virtual memory 60. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to primary logical partition 40. Bus 64, on the other hand, may have resources allocated on a resource-by-resource basis, e.g., with local area network (LAN) adaptor 76, optical disk drive 78 and DASD 80 allocated to secondary logical partition 42, and LAN adaptors 82 and 84 allocated to secondary logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 2 is merely exemplary in nature, and that any combination and arrangement of resources may be allocated to any logical partition in the alternative. Moreover, it will be appreciated that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs", or simply "programs". The computer programs typically comprise one or more instructions that are resident at various times in various memory and storage devices in the computer, and that, when read and executed by one or more processors in the computer, cause that computer to perform the steps necessary to execute steps or elements embodying the various aspects of the invention. Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of signal bearing medium used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

License Management in a Partitioned Computer Environment

License management consistent with the invention utilizes a shared service to provide global tracking of uses of one or more licensed computer programs. In the illustrated implementation of FIG. 2, for example, license management is implemented using one or more license managers 90 disposed in each logical partition. Each license manager 90 has access to a shared service, represented by use tracker block 92, which maintains counts of the active uses of all tracked licensed computer programs. Use tracker 92 is illustrated as resident in the shared services 48 of partition manager 46, although tracking of license uses may be performed by other components in other implementations.

The license manager 90 in each logical partition handles the function of granting or denying requests to execute a licensed application 94 resident in the partition. To do so, each license manager relies on the shared service, implemented in use tracker 92, to retrieve an indication of the global count of uses within computer 10 across all logical partitions.

Figure 3:
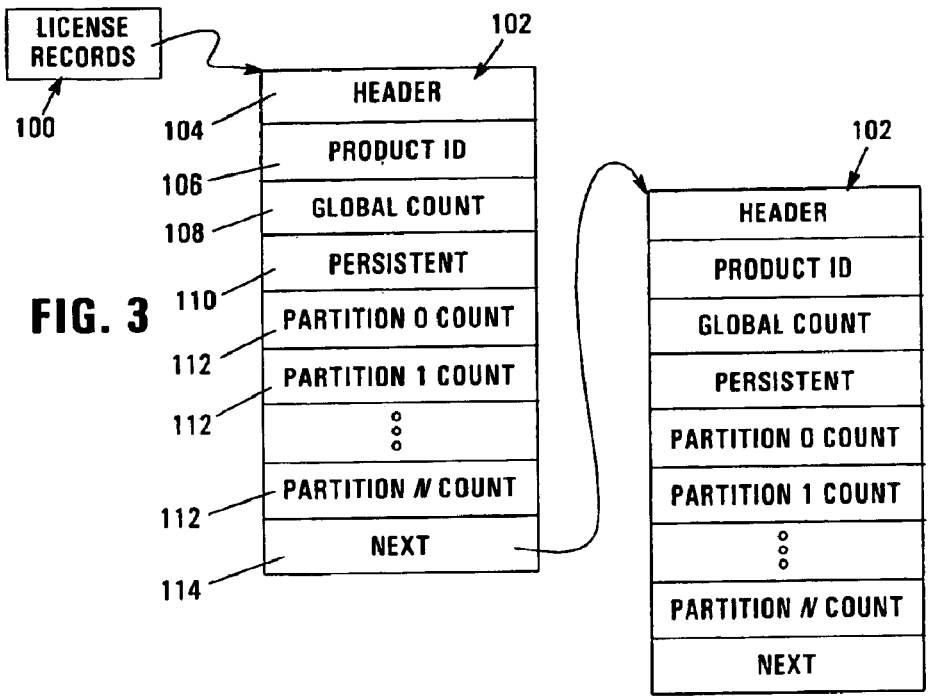
FIG. 3 is a block diagram of a license list data structure consistent with the invention.

To track uses of one or more computer programs across the various logical partitions in computer 10, use tracker 92 maintains a database of license records, e.g., in the form of a license list 100 shown in FIG. 3. List 100 is implemented as a linked list, including a plurality of license records 102, each including a plurality of fields 104-114.

Field 104 of each license record provides a header that uniquely identifies the license record. Field 106 provides a product identifier that identifies the product, or licensed computer program, with which the record 102 is associated.

Field 108 stores a global count, representing the total number of current concurrent uses of the licensed computer program across all logical partitions. Field 110 stores a "persistent" flag that indicates whether or not a use of the licensed computer program will survive the powering down of a logical partition. When the persistent flag is not set, the current usage count for that logical partition is discarded upon power down.

Fields 112 store usage counts for each of N logical partitions in the computer. As such, a variable number of fields may be provided to support any number of logical partitions. Moreover, other data structures, e.g., linked lists, and the like, may also be used to support a variable number of logical partitions.

Field 114 stores a pointer to the next license record 102 in the linked list. The last license record 102 has a NULL value stored in field 114. It should be appreciated, however, that any number of alternate data structures may be utilized to store the information provided in each license record 102.

To support license management across multiple logical partitions, several services are made available by use tracker 92 to each license manager 90. In particular, in the illustrated implementation, the following services are made available to the license manager in each logical partition:

int incrementCount(product_id, persistent)
        increment count for product associated with product_id and set "persistent" flag to persistent (TRUE or FALSE).
    int decrementCount(product_id)
        decrement count for product associated with product_id
    int getCount(product_id, partition_id)
        get count for product associated with product_id in requested partition
    int setCount(product_id, count, persistent)
        set partition count for product associated with product_id to count and set "persistent" flag to persistent (TRUE or FALSE).
    removeCount(product_id)
        remove all uses of product associated with product_id in this partition In the above services, product_id is the identifier for a licensed computer program, count is an integer to set the partition count to, persistent is a boolean value used to set or reset the "persistent" flag for the licensed computer program, and partition_id identifies another logical partition in the computer. All services except removeCount( ) return the resulting global count for the identified licensed computer program.

Figure 4:
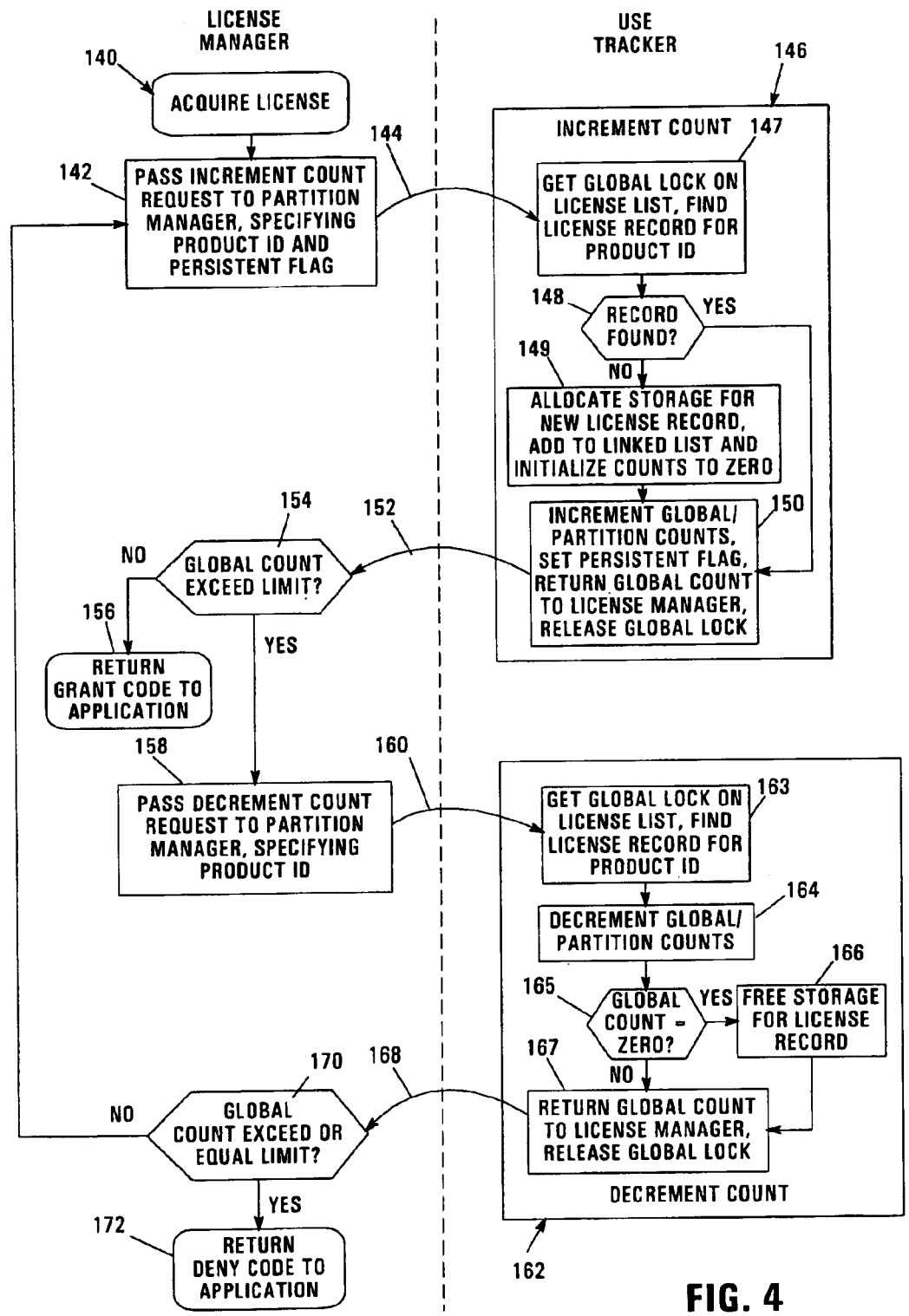
FIG. 4 is a flowchart illustrating the program flow of an acquire license routine initiated by a license manager in the computer of FIGS. 1 and 2.

The use of the aforementioned services in performing license management consistent with the invention is further explained in connection with the license management operations illustrated in FIGS. 4–8. FIG. 4 illustrates an acquire license routine 140 initiated by a license manager in one of the logical partitions. Routine 140 is called in response to a request from a user to use a licensed computer program. As shown in block 142, license manager 90, in response to such a request, passes an incrementCount( ) request to the partition manager, specifying the product ID of the requested licensed computer program and a value for the persistent flag. This function call is represented at 144. The incrementCount( ) request is handled by an increment count routine 146, which begins in block 147 by obtaining a global lock on the license list, and attempting to find the license record for the requested product identifier. Control passes to block 148 to determine whether the license record was found.

If not, a new licensed computer program is being tracked, so control passes to block 149 to allocate storage for a new license record for the new licensed computer program and initialize all counts to zero. The license record is also appended to the linked list. Next, block 150 increments both the global and partition counts for the license record for the requested program, and returns the new global count to the license manager (represented at 152). In addition, block 150 sets the persistent flag to that provided to the routine and releases the previously-obtained global lock on the license list. Also, returning to block 148, if a license record was found, control is passed directly to block 150, bypassing creation of a new license record for the licensed computer program.

Once the license manager retrieves the global count, control passes to block 154 to determine whether the global count exceeds the limit specified for the concurrent use license associated with the licensed computer program. If not, control passes to block 156 to return a "grant" code to the requesting application, thereby permitting the execution of the application to proceed. If, however, the global count has been exceeded, control instead passes to block 158 to pass a decrementCount( ) request to the partition manager, again specifying the product ID of the licensed computer program. The request is represented at 160.

In response to the decrementCount( ) request, use tracker 92 executes a decrement count routine 162, which begins in block 163 by obtaining a global lock on the license list, and finding the license record associated with the requested product ID. Control then passes to block 164 to decrement both the global and partition counts for the licensed computer program. Next, block 165 determines whether the global count is zero. If so, control passes to block 166 to free the storage for the license record and remove the record from the linked list. Control then passes to block 167 to return the global count to the license manager (represented at 168), and release the global lock obtained in block 163. Routine 162 is then complete. Moreover, returning to block 165, if the global count is not zero, control passes directly to block 167, bypassing block 166.

Once the global count is returned by routine 162, license manager 90 determines in block 170 whether the returned global count exceeds or equals the limit set forth in the software license associated with the computer program. If not, it is likely that a concurrent use has been released since the original request, so control returns to block 142 to retry the attempt to obtain a license to use the licensed computer program. If, however, the global count is exceeded or equaled, control passes to block 172 to return a "deny" code to the requesting application, whereby routine 140 is complete. In the alternative, block 170 may be omitted, whereby no retry attempt is made if an initial attempt to acquire a license is unsuccessful.

Figure 5:
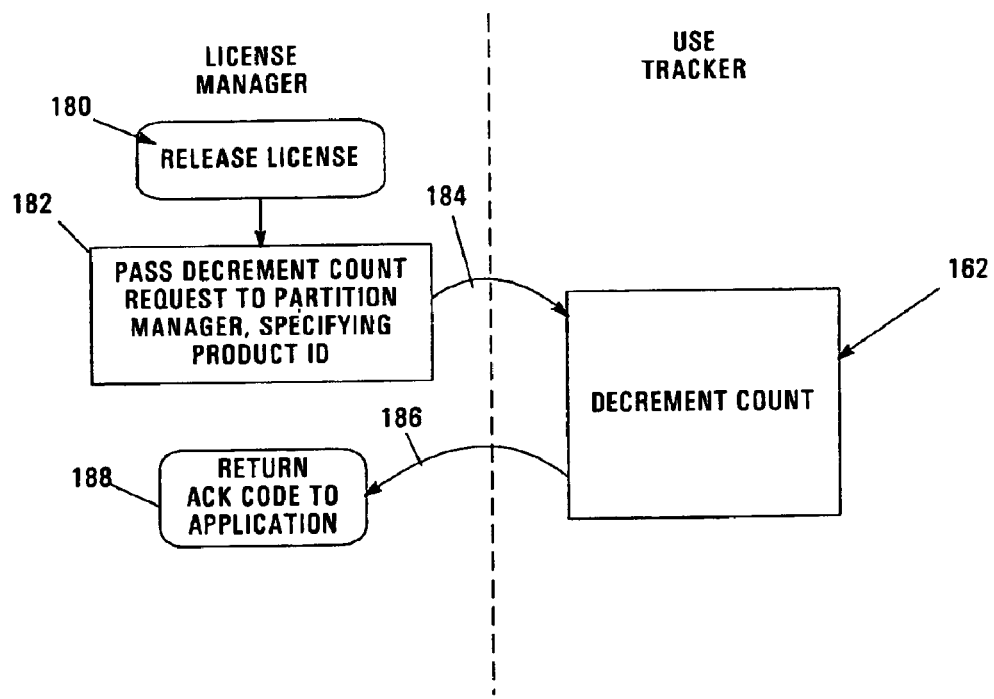
FIG. 5 is a flowchart illustrating the program flow of a release license routine initiated by a license manager in the computer of FIGS. 1 and 2.

FIG. 5 illustrates a release license routine 180 called by license manager 90 in response to termination of a license computer program by one of the users in the logical partition associated with the license manager. Routine 180 begins in block 182 by passing a decrementCount( ) request to the partition manager, specifying the product ID of the licensed program being terminated. The request is represented at 184. In response to the request, use tracker 92 executes decrement count routine 162 (described above in connection with FIG. 4), resulting in the new global count being returned to the license manager, as represented at 186. Upon completion of routine 162, control returns to block 188 to return an acknowledge code to the application, indicating that the termination of the application may proceed.

Figure 6:
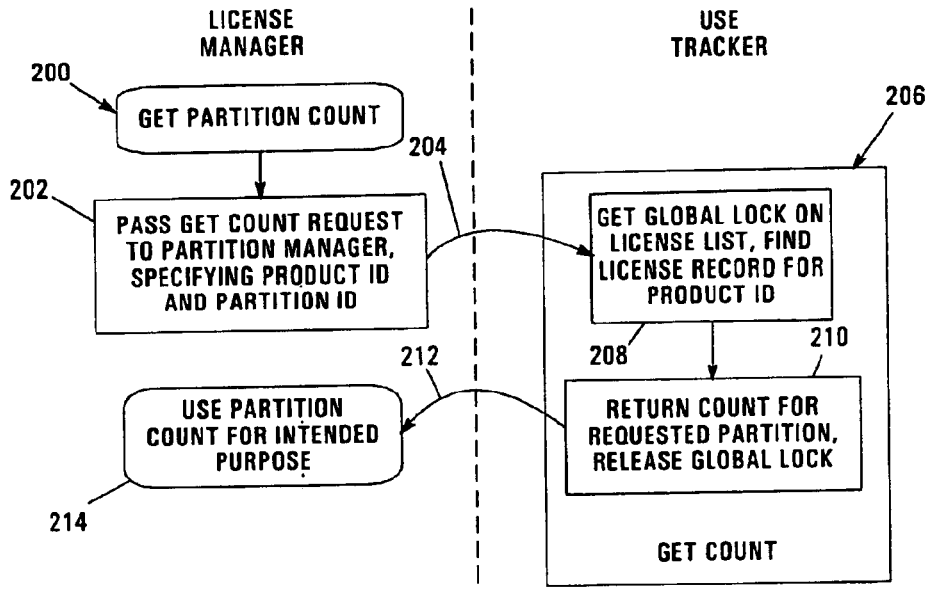
FIG. 6 is a flowchart illustrating the program flow of a get partition count routine initiated by a license manager in the computer of FIGS. 1 and 2.

FIG. 6 illustrates a get partition count routine 200 executed by a license manager to retrieve a partition count for use in performing more advanced license management functions such as displaying partition counts to a system operator. Routine 200 begins in block 202 by passing a getcount( ) request to the partition manager, specifying both the product identifier of the licensed computer program and the partition identifier of the partition for which it is desired to obtain a partition count (represented at 204). In response to the request, use tracker 92 executes a get count routine 206, which begins in block 208 by obtaining a global lock on the license list and finding the license record associated with the requested product ID. Next, in block 210, the count associated with the requested partition is returned (represented at 212), and the previously-requested global lock on the license list is released. Routine 206 then terminates, returning control to block 214, whereby the license manager utilizes the partition count for its intended purpose. It may also be desirable to perform error checking in routine 206, e.g., to verify whether a license record exists for the requested product identifier.

Figure 7:
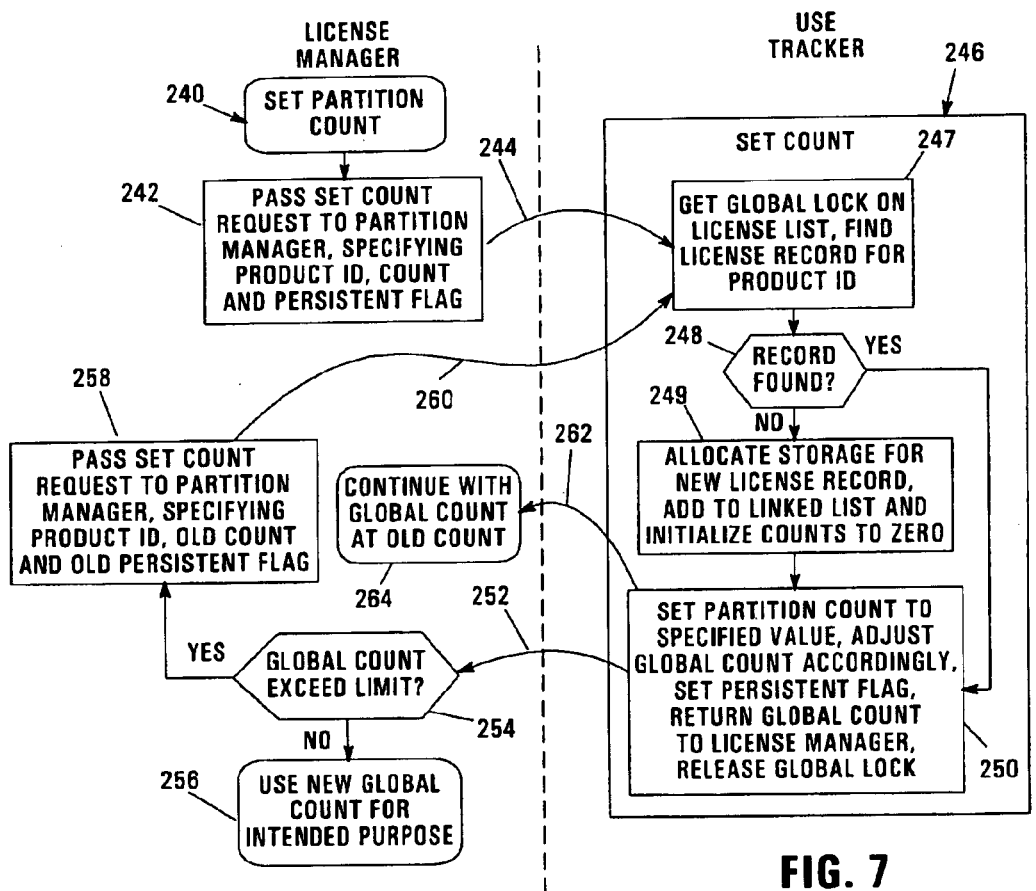
FIG. 7 is a flowchart illustrating the program flow of a set partition count routine initiated by a license manager in the computer of FIGS. 1 and 2.

FIG. 7 illustrates a set partition count routine 240 executed by a license manager to set the partition count for a licensed computer program to a predetermined value. As shown in block 242, license manager 90, in response to such a request, passes a setCount( ) request to the partition manager, specifying the product ID of the requested licensed computer program, a desired count and a value for the persistent flag. This function call is represented at 244. The setcount( ) request is handled by a set count routine 246, which begins in block 247 by obtaining a global lock on the license list, and attempting to find the license record for the requested product identifier. Control passes to block 248 to determine whether the license record was found.

If not, a new licensed computer program is being tracked, so control passes to block 249 to allocate storage for a new license record for the new licensed computer program and initialize all counts to zero. The license record is also appended to the linked list. Next, block 250 sets the partition count to that supplied with the request and adjusts the global count accordingly (typically by subtracting the original partition count and adding the new partition count), and returns the new global count to the license manager (represented at 252). In addition, block 250 sets the persistent flag to that provided to the routine and releases the previously-obtained global lock on the license list. Also, returning to block 248, if a license record was found, control is passed directly to block 250, bypassing creation of a new license record for the licensed computer program.

Once the license manager retrieves the global count, control passes to block 254 to determine whether the global count exceeds the limit specified for the concurrent use license associated with the licensed computer program. If not, control passes to block 256 to use the new global count for its intended purpose. If, however, the global count has been exceeded, control instead passes to block 258 to pass a setCount( ) request to the partition manager, this time specifying the old partition count (prior to the last attempt to set the count), along with the product ID of the licensed computer program and the old persistent flag. The request is represented at 260, and is handled by routine 246 in the manner discussed above. By setting the partition count back to the original value, the original global count is returned (as represented at 262, and processing proceeds using the old global count, as represented by block 264.

Figure 8:
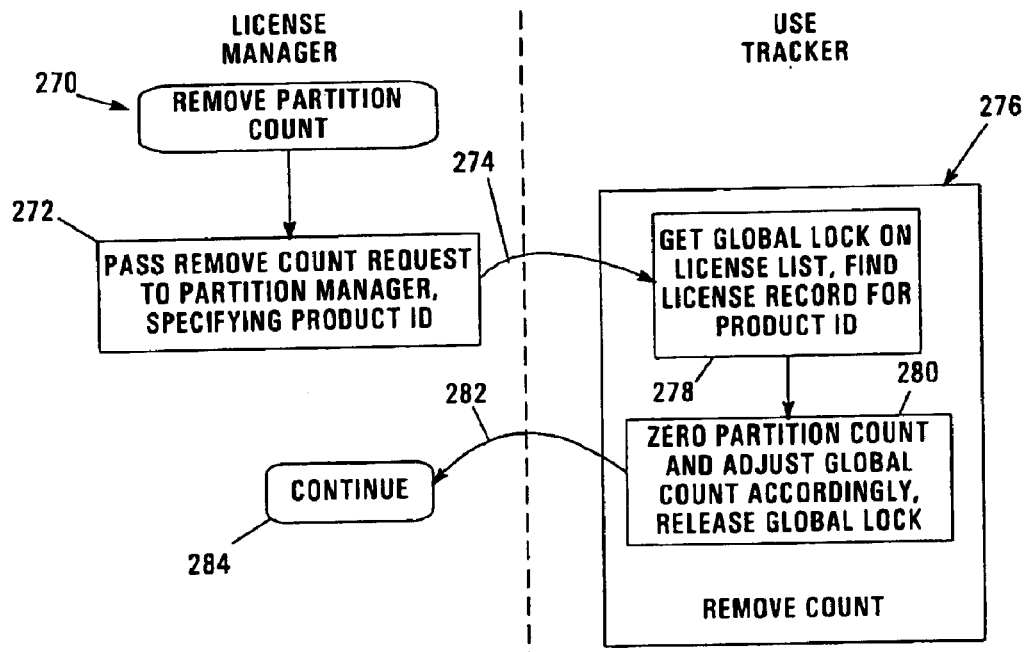
FIG. 8 is a flowchart illustrating the program flow of a remove partition count routine initiated by a license manager in the computer of FIGS. 1 and 2.

FIG. 8 illustrates a remove partition count routine 270 executed by a license manager to remove (zero) the partition count for a given licensed computer program. Routine 270 begins in block 272 by passing a removeCount( ) request to the partition manager, specifying the product identifier of the licensed computer program (represented at 274). In response to the request, use tracker 92 executes a remove count routine 276, which begins in block 278 by obtaining a global lock on the license list and finding the license record associated with the requested product ID. Next, in block 280, the count associated with the requested partition is zeroed, the global count is adjusted accordingly, and the previously-requested global lock on the license list is released. Routine 276 then terminates, returning control to block 284 (as represented at 282). It may also be desirable to perform error checking in routine 276, e.g., to verify whether a license record exists for the requested product identifier.

Figure 9:
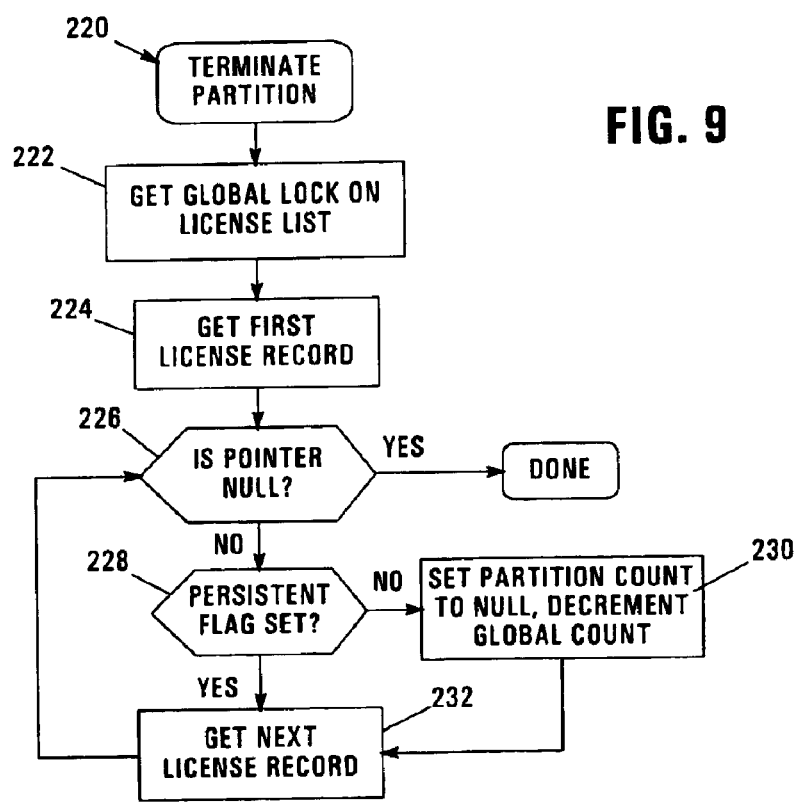
FIG. 9 is a flowchart illustrating the program flow of a terminate partition routine executed by the partition manager in the computer of FIGS. 1 and 2.

Another often desirable license management function performed by computer 10 is the handling of the termination of a partition. For example, as shown in FIG. 9, a terminate partition routine 220 may be executed by use tracker 92 in response to termination of a secondary partition on computer 10. Routine 220 is typically called by the partition manager after it is detected that a secondary partition has been terminated. Additional operations not relevant to the invention, are also performed by the partition manager to handle the power down of the partition. The routine begins in block 222 by obtaining a global lock on the license list. Block 224 then proceeds to the first license record in the license list, and control passes to block 226 to determine whether the pointer is NULL, representing that the last license record in the list has been processed.

If additional license records remain to be processed, control passes to block 228 to determine whether the persistent flag (maintained in field 210 of FIG. 3) for the currently-processed license record is set. If not, control passes to block 230 to set the partition count to a NULL value, and decrement the global count by the partition count previously associated with the terminated partition. Control then passes to block 232 to obtain the next license record, typically by retrieving the pointer stored in next field 214 of the currently-processed license record. Returning to block 228, if the persistent flag is set, control passes directly to block 232, by-passing block 230. Once the next license record is obtained, control passes from block 232 to block 226 to determine whether the pointer retrieved in block 232 is NULL, indicating that all license records have been processed. If any additional license records still must be processed, control passes to block 228. Otherwise, routine 220 terminates, and additional processing associated with terminating the partition is completed.

Various modifications may be made to the illustrated embodiments without departing from the spirit and scope of the invention. For example, rather than making the determination as to whether to grant or deny a requested use within a license manager, such functionality may be implemented in the shared services accessible by all partitions. However, by allowing each logical partition to separately manage the license parameters as disclosed herein, it may be possible in some implementations to support varying license requirements for each logical partition (e.g., three concurrent uses in one logical partition, and five uses in another logical partition).

Moreover, rather than dynamically adding and removing license records, separate services may be provided to add and remove license records, e.g., as part of the installation and uninstallation of a licensed computer program.

A number of advantages are realized by embodiments consistent with the invention. For example, license management in the manner disclosed herein is typically independent of the number of partitions, and doesn't require that a computer be partitioned in any particular manner, or that a user know how many partitions are going to be used on a computer at the time of installation of a licensed computer program. Also, in many instances partitions may be dynamically added or removed after tracking of a licensed computer program is initiated, with the total number of uses across all partitions automatically maintained as partitions are added to or removed from the computer.

Other modifications will be apparent to one of ordinary skill in the art. Therefore, the invention lies in the claims hereinafter appended.

What is claimed is:

1. A method of managing a concurrent use software license in a logically partitioned computer, the method comprising:

(a) tracking concurrent uses of a computer program across a plurality of logical partitions in the logically partitioned computer using a partition manager accessible by the plurality of logical partitions, wherein each logical partition includes an operating system resident therein, and wherein the partition manager is configured to allocate hardware resources in the logically partitioned computer, to each of the plurality of logical partitions; and (b) with a license manager resident in a first logical partition among the plurality of logical partitions, accessing the partition manager in response to a request to use the computer program in the first logical partition and selectively denying the request to use the computer program in the first logical partition if permitting the requested use would violate a concurrent use software license associated with the computer program.

2. The method of claim 1, wherein tracking concurrent uses of the computer program includes maintaining a global count of the number of concurrent uses of the computer program across the plurality of logical partitions.

3. The method of claim 2, further comprising receiving the global count from the partition manager in response to the access thereto, and wherein selectively denying the request includes denying the request when the global count is at least equal to a maximum number of concurrent uses permitted by the concurrent use software license.

4. The method of claim 2, further comprising:

(a) incrementing the global count whenever a request to use the computer program is granted; and (b) decrementing the global count whenever a use of the computer program is terminated.

5. The method of claim 4, wherein each logical partition includes a local license manager.

6. The method of claim 5, wherein each of incrementing and decrementing the global count includes passing a program identifier to the partition manager.

7. The method of claim 5 further comprising determining in the local license manager for the first logical partition whether permitting the requested use would violate the concurrent use software license.

8. The method of claim 1, further comprising tracking concurrent uses of a plurality of computer programs across the plurality of logical partitions.

9. An apparatus, comprising:

(a) a logically partitioned computer including a plurality of logical partitions;

(b) a plurality of operating systems, each resident in a different logical partition among the plurality of logical partitions; and (c) a first program resident in the computer, the first program configured to manage a concurrent use software license for a second program in the computer by tracking concurrent uses of the second program across the plurality of logical partitions, and selectively denying a request to use the second program in a first logical partition if permitting the requested use would violate the concurrent use software license, wherein the first program includes:

(i) a partition manager accessible by the plurality of logical partitions and configured to track the concurrent uses of the second program across the plurality of logical partitions, and to allocate hardware resources to each of the plurality of logical partitions; and (ii) a license manager resident in the first logical partition and configured to access the partition manager in response to the request to use the second program in the first logical partition.

10. The apparatus of claim 9, wherein the partition manager is configured to track concurrent uses of the second program by maintaining a global count of the number of concurrent uses of the second program across the plurality of logical partitions.

11. The apparatus of claim 10, wherein the license manager is further configured to receive the global count from the partition manager in response to the access thereto, and to selectively deny the request when the global count is at least equal to a maximum number of concurrent uses permitted by the concurrent use software license.

12. The apparatus of claim 10, wherein the license manager is further configured to increment the global count whenever a request to use the second program is granted, and to decrement the global count whenever a use of the second program is terminated.

13. The apparatus of claim 12, wherein the license manager is resident in the first logical partition, and wherein each additional logical partition includes an associated local license manager.

14. The apparatus of claim 12, wherein the global count is associated with a program identifier for the second program, and wherein the license manager is configured to pass the program identifier to the partition manager when accessing the partition manager.

15. The apparatus of claim 9, wherein the partition manager is further configured to track concurrent uses of a plurality of programs across the plurality of logical partitions.

16. An apparatus, comprising:

(a) a plurality of logical partitions;

(b) a plurality of operating systems, each resident in a different logical partition among the plurality of logical partitions;

(c) a partition manager configured to track concurrent uses of a computer program across the plurality of logical partitions, and to allocate hardware resources to each of the plurality of logical partitions; and (d) a plurality of license managers, each license manager resident in an associated logical partition among the plurality of logical partitions, and each license manager configured to access the partition manager responsive to a request to use the computer program in the associated logical partition.

17. A program product, comprising:

(a) a first program configured to manage a concurrent use software license for a second program in a logically-partitioned computer of the type including a plurality of logical partitions, with each logical partition including an operating system resident therein, the first program including a partition manager accessible by the plurality of logical partitions and configured to track concurrent uses of the second program across the plurality of logical partitions in the logically-partitioned computer, and to allocate hardware resources to each of the plurality of logical partitions, and a license manager, resident in a first logical partition among the plurality of logical partitions and configured to access the partition manager in response to a request to use the second computer program in the first logical partition and selectively deny the request if permitting the requested use would violate the concurrent use software license; and (b) a signal bearing medium bearing the first program.

18. The program product of claim 17, wherein the signal bearing medium includes at least one of a recordable medium and a transmission-type medium.

* * * * *